United States Patent [19]

Abe

[11] Patent Number: 5,280,520
[45] Date of Patent: Jan. 18, 1994

[54] APPARATUS FOR SPEED AND DATA COMMUNICATION

[75] Inventor: Shintaro Abe, Fujisawa, Japan

[73] Assignee: Canon Kabushiki Kaisha, Tokyo, Japan

[21] Appl. No.: 999,550

[22] Filed: Dec. 30, 1992

Related U.S. Application Data

[63] Continuation of Ser. No. 543,416, Jun. 26, 1990, abandoned.

[30] Foreign Application Priority Data

Jun. 28, 1989 [JP] Japan .................. 1-163854

[51] Int. Cl.⁵ ............................... H04M 11/00
[52] U.S. Cl. ...................... 379/100; 379/93; 370/110.1
[58] Field of Search ............. 379/100, 355, 216, 93, 379/94; 358/468; 370/110.1

[56] References Cited

U.S. PATENT DOCUMENTS

| | | | |
|---|---|---|---|
| 4,825,461 | 4/1989 | Kurita et al. | 379/100 |
| 4,920,560 | 4/1990 | Kageyama | 379/100 |
| 4,995,073 | 2/1991 | Okata et al. | 379/100 |

OTHER PUBLICATIONS

Epson America, Inc. advertisement "Epson Priority Fax 3000" (1989).
British Telecom, Eng., vol. 7, Apr. 1988, pp. 46-57, Davies, CCITT signalling system No. 7: "Integrated services digital network user part".
IEEE Global Telecom. Conf. Dec. 2-5, 1985, vol. 1, pp. 363-367, Chiariglione et al. "Multimedia communication at the basic ISDN access".
Telcom Report, 1985, pp. 38-43 (Liske et al.).
IEEE Trans Consumer Electronics, vol. CE-31, No. 3, Aug. 1985, pp. 311-322.

Primary Examiner—James L. Dwyer
Assistant Examiner—Ahmad F. Matar
Attorney, Agent, or Firm—Fitzpatrick, Cella, Harper & Scinto

[57] ABSTRACT

A communication apparatus connectable to an ISDN network and having a communication function and a data communication function comprises a memory for storing a destination number in a speech mode, an instruction unit for instructing data communication in the speech mode, and call means for calling based on the destination number stored in the memory in response to an instruction from the instruction unit.

12 Claims, 6 Drawing Sheets

APPARATUS FOR SPEED AND DATA COMMUNICATION

This application is a continuation of application Ser. No. 07/543,416 filed Jun. 26, 1990 (now abandoned).

BACKGROUND OF THE INVENTION

1. Field of the Invention

The present invention relates to a communication apparatus to be connected to an Integrated Services Digital Network (ISDN) network.

2. Related Background Art

In a G3 facsimile machine connected to a public network for transmitting an image signal by an analog signal, it is not permitted to simultaneously effect communication by a telephone set and facsimile communication. However, in an ISDN network, it is permitted to connect a plurality of communication terminals such as telephone sets and facsimile machines to buses, and connect a communication terminal having both telephone and facsimile functions to each terminal to permit simultaneous communication by the telephone set and the facsimile machine.

FIG. 2A shows a basic interface of a common ISDN network. Numeral 21 denotes a telephone set and numeral 22 denotes a facsimile machine. In this basic interface, up to eight communication terminals may be connected. In FIG. 2B, a telephone set 21 and facsimile machines 23 and 24 with telephone sets are connected to the basic interface of the ISDN network.

In such a configuration, in many cases, the telephone set and the facsimile machine have the same address. However, at the initial connection stage in the ISDN, there is a step to inform the type of terminal to each other to keep consistency in a communication protocol, and hence it is not permitted to switch from the telephone set to the facsimile machine, as opposed to the G3 facsimile machine. Accordingly, if it is desired to switch to the facsimile machine of the same address during the speech by the telephone set in the ISDN network, it is necessary to place the telephone set on hook and then manipulate to connect the line to the facsimile machine. When it is desired to transmit a signal to the facsimile machine during the speech by the telephone set, it is necessary to redial from a sending station and designate the address (number) even if the address of the facsimile machine is same as that of the telephone set under connection.

SUMMARY OF THE INVENTION

It is an object of the present invention to improve a communication apparatus for an ISDN in order to overcome the above problems.

It is another object of the present invention to provide a communication apparatus which permits easy shift from communication by one terminal to communication by other terminal.

It is another object of the present invention to provide a communication apparatus which calls a destination terminal connected to an ISDN network, and if a responding terminal is not a desired one, permits communication with the desired terminal with an easy operation.

It is another object of the present invention to permit easy shift from a communication status by a communication terminal to data communication by a data terminal.

Other objects of the present invention will be apparent from the following detailed description and drawings of the preferred embodiments.

DETAILED DESCRIPTION OF THE PREFERRED EMBODIMENTS

One embodiment of the present invention is now explained in detail with reference to the drawings.

In the following embodiment, a facsimile machine is explained, although a communication apparatus which communicates code data such as a telex machine may be connected to the ISDN and the present invention is applicable to any communication apparatus which may be connected to the ISDN.

A configuration of the facsimile machine of the present embodiment is first explained.

Figure 1:
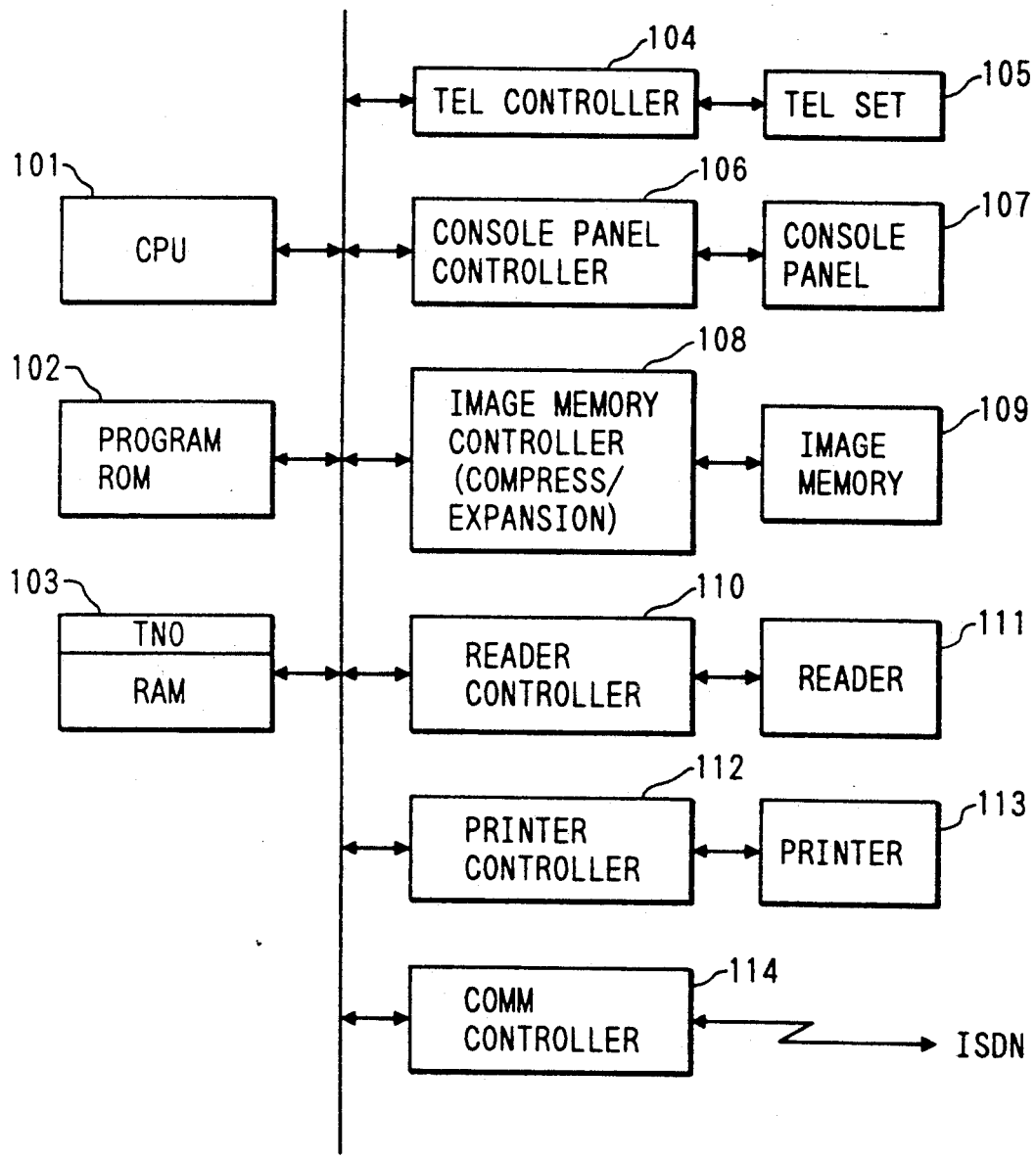
FIG. 1 shows a block diagram of a facsimile machine in accordance with one embodiment.
Figure 2A:
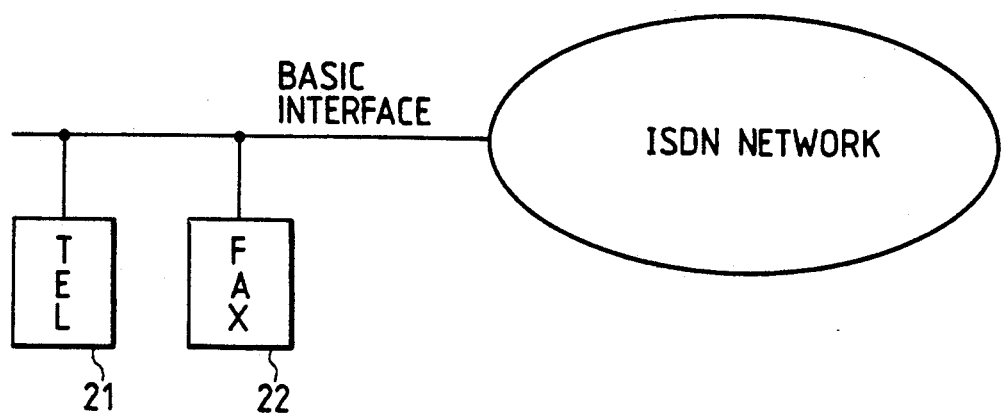
FIGS. 2A and 2B shown terminal connections in a basic interface of an ISDN network.
Figure 2B:
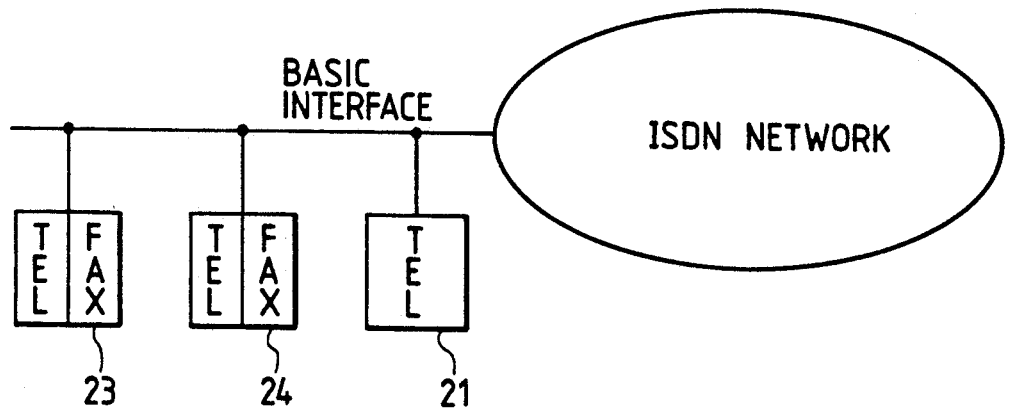

FIG. 1 shows a block diagram of the facsimile machine in the embodiment.

Figure 4:
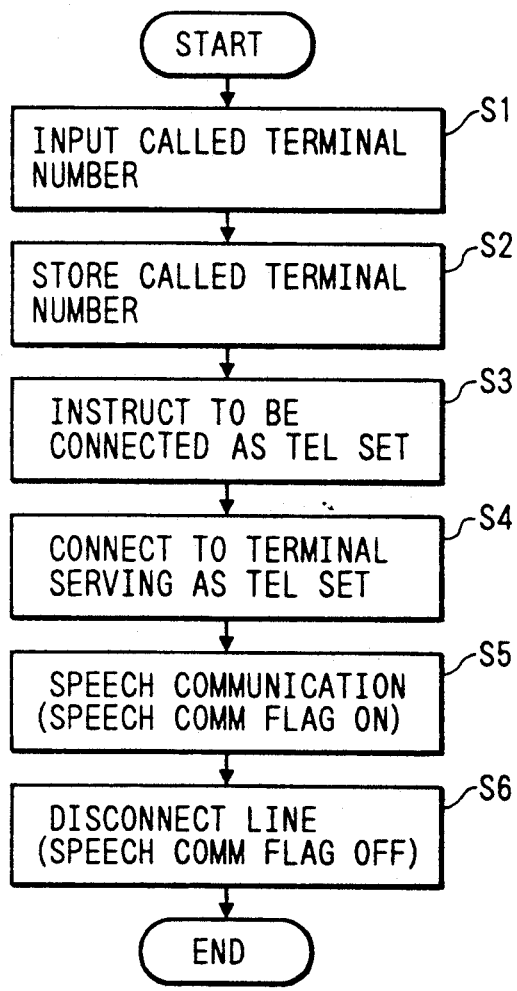
FIG. 4 shows a flow chart of a speech process from a telephone set.
Figure 5:
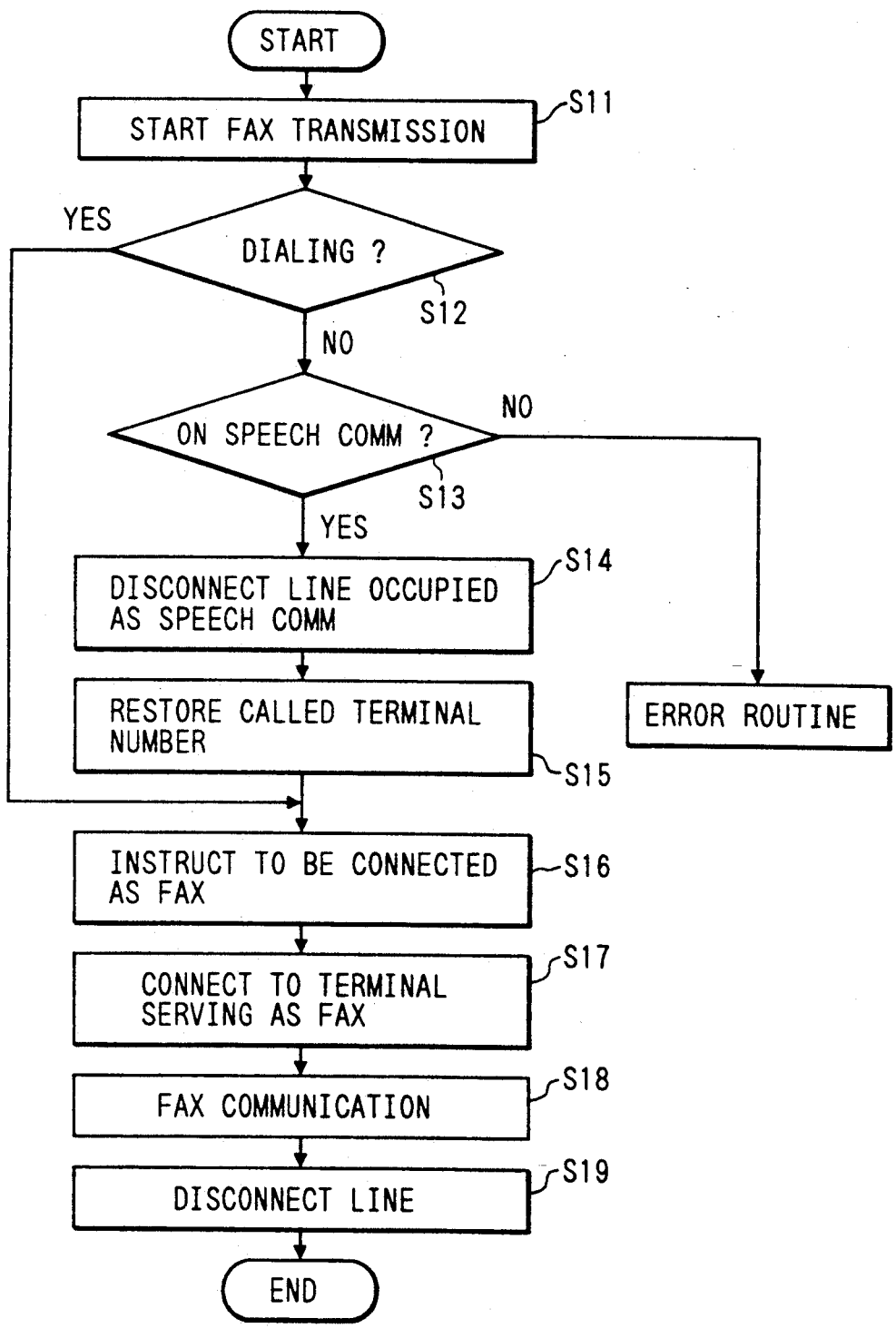
FIG. 5 shows a flow chart of a process for interrupting speech and switching to facsimile transmission.
Figure 6:
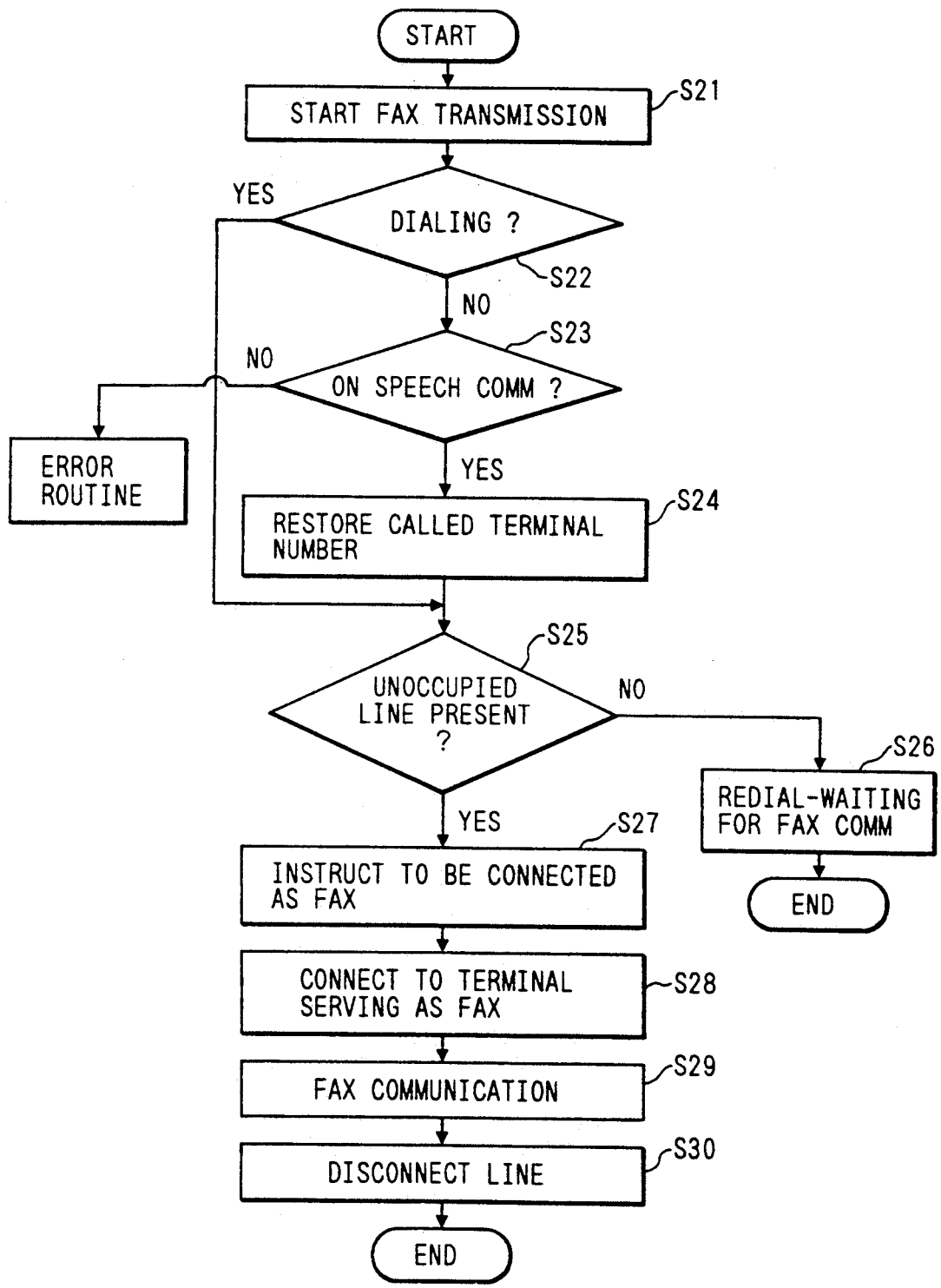
FIG. 6 shows a flow chart of a process of facsimile transmission while continuing the speech.

Numeral 101 denotes a CPU such as a microprocessor which controls an overall system, and numeral 102 denotes a program ROM which stores a control program for the CPU shown in FIGS. 4-6 and various data. Numeral 103 denotes a RAM which is used as a work area of the CPU 101 to temporarily store various data and which includes TNO for storing destination station numbers. Numeral 105 denotes a telephone set provided in the facsimile machine, and numeral 104 denotes a telephone controller for controlling the telephone set 105.

Numeral 107 denotes a console panel which has telephone dialing keys, various operation keys and function keys, and a display such as a liquid crystal display or an LED. Numeral 106 denotes a console panel controller for controlling the display of the console panel 107 and processing key entries. Numeral 109 denotes an image memory which stores document image data read by a reader 111 and image data received from the ISDN network. Numeral 108 denotes an image memory controller which has a function (of compression/decompression) of decoding the received MMR-coded image data and MMR-coding the image data read by the reader 111.

Numeral 111 denotes a reader which optoelectrically reads a document image and outputs as a digital signal, and numeral 110 denotes a reader controller for controlling the reader 111. Numeral 113 denotes a printer which forms an image on a record sheet based on the received image data or the image data read by the reader 111. Numeral 112 denotes a printer controller which controls the operation of the printer 113. Numeral 114 denotes a line controller (communication controller) which controls the communication between the facsimile machine and the ISDN network.

A terminal connection procedure (FIG. 3) in the ISDN is now explained.

Figure 3:
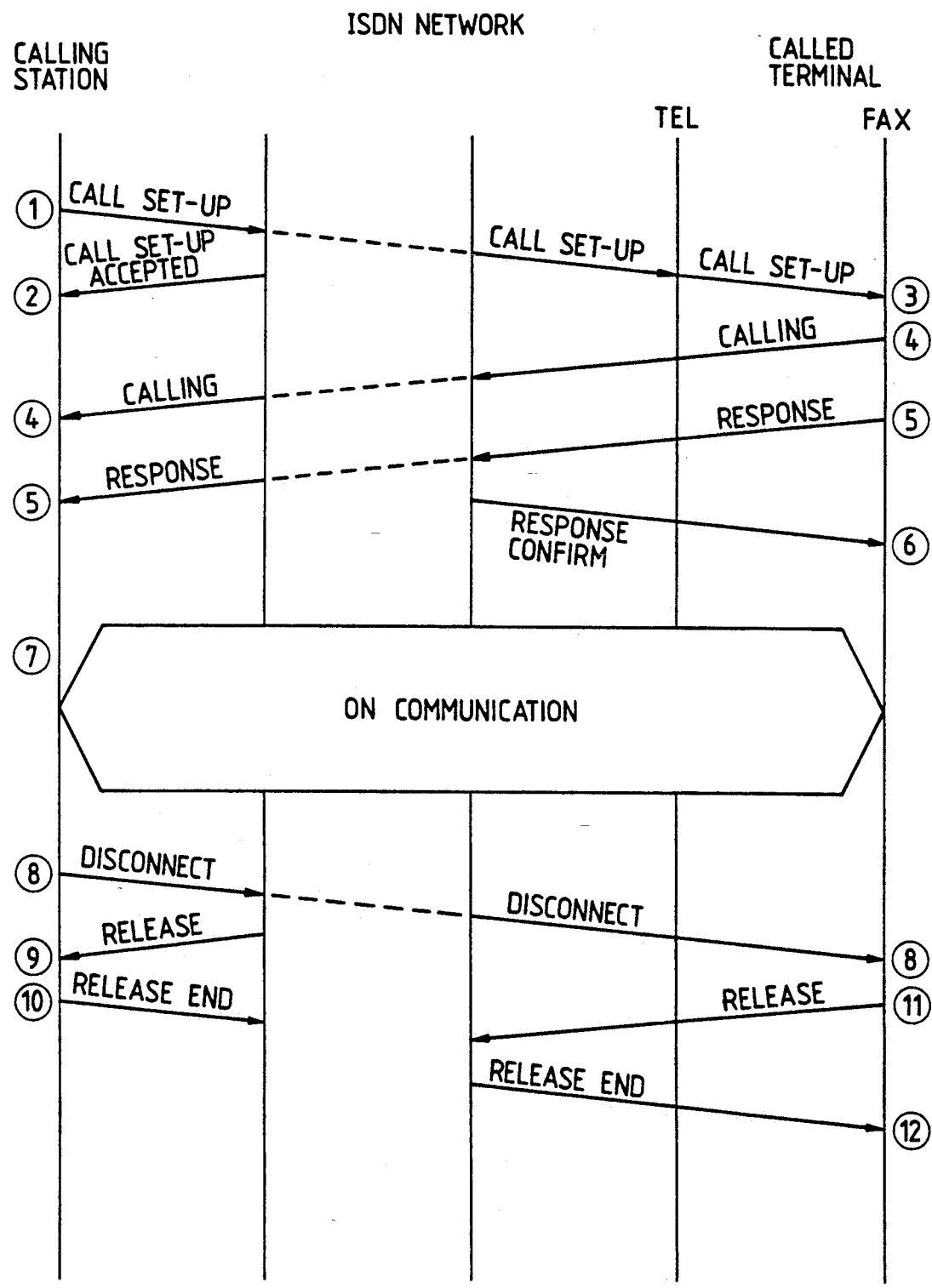
FIG. 3 shows a communication protocol between the ISDN network and a calling/called terminal.

FIG. 3 shows a sequence of a basic terminal connection on the ISDN.

① CALL SET UP is sent from a calling terminal to the ISDN network. The CALL SET UP includes calling/called terminal numbers, transmission capability (BC) and matching confirmation information, and the communication protocal and transmission data matching is made between the calling terminal and the called terminal based on the above information.

② The ISDN network sends an acceptance message for the CALL SET UP if a channel B is available.

③ The CALL SET UP message is sent to a plurality of terminals on the bus.

④ Each terminal examines the information included in the CALL SET UP, and if it cannot immediately respond, it sends a CALL message to the ISDN network. When the ISDN network received the CALL message, it informs to the calling terminal that the called terminal is calling.

⑤ Each terminal examines the information included in the CALL SET UP, and if it determines that the communication is permitted, it sends a RESPONSE message to the ISDN network. The RESPONSE message is informed to the calling terminal by the ISDN network. The RESPONSE message indicates that the called terminal is ready for reception and requests a communication path.

⑥ For the RESPONSE message from the called terminal, the ISDN network sends a RESPONSE ACKNOWLEDGE message to the called terminal.

⑦ Both the calling terminal and the called terminal are in a data transfer phase, and the image data is transmitted and received.

⑧ When a DISCONNECTION REQUEST message is received from the calling terminal, it is sent to the called terminal by the ISDN network.

⑨ When a RELEASE message which informs the acceptance of the DISCONNECTION REQUEST is sent back to the calling terminal by the ISDN network, the channel B of the ISDN network is released.

⑪ When a RELEASE message which informs the accep of the DISCONNECTION REQUEST is sent to the ISDN network from the called terminal, the release of the call number of the called terminal is informed to the ISDN network.

⑩ , ⑫ END OF RELEASE messages from the calling terminal and the ISDN network for the RELEASE message.

A speech operation by the telephone set is now explained.

FIG. 4 shows a flow chart of a call operation in a telephone set (including a telephone set provided in a facsimile machine) connected the ISDN network.

In a step S1, a terminal number of a called terminal is entered by the console panel 107. In a step S2, the terminal number is stored in the TNO of the RAM 103. In a step S3, an instruction to connect as a telephone set is issued from the console panel 107. In a step S4, the CALL SET UP is issued to supply the called terminal number and the matching confirmation information to the called terminal (ISDN network). Thus, a terminal which is ready for communication responds and the calling terminals and the called terminal are connected through the procedures ① to ⑥ shown in FIG. 3.

In a step S5, the speech communication by the telephone set 105 is effected between the calling terminal and the called terminal, and a speech flag (not shown) in the RAM 103 is set. In a step S6, the speech flag is reset when the speech is over and the telephone set is placed on hook, and the line is disconnected through the procedures ⑧- ⑩ of FIG. 3.

A facsimile transmission operation is now explained.

FIG. 5 shows a flow chart of a facsimile transmission process in the facsimile machine of the embodiment. In a step S11, the facsimile transmission is instructed by the console panel 107. In a step S12, the entry of the destination terminal telephone number by dialing is checked. If it has been entered, the process proceeds to a step S16, and if it has not been entered, the process proceeds to a step S13 to check whether it is busy or not, based on the speech flag. If it is not busy, an error processing routine is started. If it is busy, the process proceeds to a step S14 to disconnect the line through the procedures ⑧- ⑩ of FIG. 3.

In a step S15, the called terminal number stored in the step S2 of FIG. 4 is read. In a step S16, a CALL SET UP message is sent to the destination terminal by the communication controller 114 based on the called terminal number read in the step S15 or the number entered in the step S12. Thus, a terminal which is ready for the facsimile communication responds. In a step S17, it is connected with the called facsimile machine. In step S18, the facsimile communication is effected, and when the communication is over, the line is disconnected through the procedures ⑧- ⑩ of FIG. 3 and the process is terminated.

In the facsimile machine of the present embodiment, when it is desired to send a facsimile message to the terminal under speech, it is only necessary to instruct the facsimile transmission and not necessary to redial in order to send the facsimile message to the terminal under speech.

FIG. 6 shows a flow chart of another facsimile transmission process in the facsimile apparatus of the present embodiment. In this case, the speech and the facsimile transmission are effected in parallel.

In a step S21, the facsimile transmission is instructed by the console panel 107. In a step S22, the entry of the destination telephone number by dialing is checked. If it has been entered, the process proceeds to a step S25, and if it has not been entered, the process proceeds to a step S23 to check if the speech is in progress, based on the speech flag. If it is not on speech, an error process routine is started. If it is on speech, the process proceeds to a step S24 to read the called terminal number stored in the step S2 of FIG. 4 from the TNO of the RAM 103. In a step S25, whether or not there is a vacant channel in the communication channel of the ISDN network is checked. If there is no vacant channel, the process proceeds to a step S26 to monitor redialing for the facsimile communication.

If there is a vacant channel in the step S25, the process proceeds to a step S27 to send a CALL SET UP message to the destination terminal through the communication controller 114, based on the called terminal number read in the step S24 or the number entered in the step S22. Thus a terminal which is ready for facsimile communication responds. In a step S28, it is connected to the called facsimile machine. In a step S29, the facsimile communication is effected. When the communication is over, the process proceeds to a step S30 to disconnect the line through the procedures ⑧- ⑩ of FIG. 3. Then, the process is terminated.

In accordance with the facsimile machine of the present embodiment, when the facsimile transmission to the terminal under speech is desired, it is only necessary to instruct the facsimile transmission and not necessary to redial, and the facsimile transmission while speaking is attained.

As explained above, the shift from the speech mode by the telephone set to the communication by the facsimile machine is easily attained.

Further during the speech by the telephone set, the facsimile transmission to the facsimile machine at the same address is attained without redialing.

The present invention is not limited to the above embodiment but various modifications may be made.

I claim:

1. A communication apparatus connectable to an ISDN network and having a speech function and a data communication function, comprising:
   memory means for storing a destination number in a speech mode;
   instruction means for instructing data communication in the speech mode; and
   call means coupled to said instruction means, to said memory means and to said ISDN network for calling a destination on the basis of the destination number stored in said memory means in response to an instruction by said instruction means to said call means so as to make a new connection with the destination for data communication.

2. A communication apparatus according to claim 1 wherein the data communication function is conducted while the speech is maintained.

3. A communication apparatus according to claim 1 wherein shift is made from speech to data communication.

4. A communication apparatus connectable to an ISDN network and having a speech unit and a data communication unit, comprising:
   a memory for storing a destination number in a speech mode by said speech unit;
   a console unit including a manual switch for producing an instruction instructing data communication in the speech mode;
   a communication unit for calling to said ISDN network; and
   a control circuit coupled to the console unit, the communication unit and the memory for calling a destination on the basis of the destination number stored in said memory through said communication unit in response to the data communication instruction from said console unit so as to make a new connection with the destination for data communication.

5. A communication apparatus according to claim 4 wherein data communication is conducted while speech is maintained.

6. A communication apparatus according to claim 4 wherein shift is made from speech to data communication.

7. A facsimile machine connectable to an ISDN network and having a speech function by a telephone set and a facsimile communication function, comprising:
   memory means for storing a destination number in a speech mode by the telephone set;
   instruction means for instructing facsimile communication in the speech mode;
   call means coupled to said instruction means and said memory means for calling a destination on the basis of the destination number stored in said memory means in response to an instruction from said instruction means so as to make a new connection with the destination for data communication; and
   communication means coupled to said call means for making facsimile communication with the terminal of the destination number while speech is maintained.

8. A communication apparatus according to claim 7 wherein redialing is monitored when there is no vacant channel in said ISDN network.

9. A facsimile machine connectable to an ISDN network and having a speech function by a telephone set and a facsimile communication function, comprising:
   memory means for storing a destination number in a speech mode by the telephone set;
   instruction means for instructing facsimile communication in the speech mode; and
   call means coupled to said instruction means and said memory means for disconnecting a line used for the speech in response to an instruction from said instruction means and calling a destination on the basis of the destination number stored in said memory means so as to make a new connection with the destination for data communication.

10. A method for performing data communication in a speech communication mode at a communication terminal connected to an ISDN network, comprising the steps of:
    storing a destination number in the speech communication mode, and
    calling a destination on the basis of the stored destination number in response to a manual instruction for the data communication so as to make a new connection with the destination for data communication, and performing the data communication if a called destination responds to the calling.

11. A method according to claim 10 wherein the data communication and speech communication are performed in parallel with each other.

12. A method according to claim 10 wherein the speech communication is switched to the data communication.

* * * * *

UNITED STATES PATENT AND TRADEMARK OFFICE
CERTIFICATE OF CORRECTION

PATENT NO. : 5,280,520
DATED : January 18, 1994
INVENTOR(S) : SHINTARO ABE

It is certified that error appears in the above-identified patent and that said Letters Patent is hereby corrected as shown below:

ON TITLE PAGE

In [54] Title: "SPEED" should read --SPEECH--.

COLUMN 1

Line 2, "SPEED" should read --SPEECH--.

COLUMN 3

Line 9, "protocal" should read --protocol--.
Line 19, "received" should read --receives--.
Line 44, "accep" should read --acceptance--.

Signed and Sealed this

Ninth Day of August, 1994

Attest:

BRUCE LEHMAN

Attesting Officer        Commissioner of Patents and Trademarks